June 20, 1961 H. WAGNER ET AL 2,989,578

ELECTRICAL TERMINALS FOR SEMICONDUCTOR DEVICES

Filed Jan. 22, 1958

INVENTORS
H. Wagner
H. F. A. Hinrichs

BY John M. Calimafde
ATTORNEY 2,989,578

ELECTRICAL TERMINALS FOR SEMICONDUCTOR DEVICES

Hans Wagner, Nurnberg, and Hermann F. A. Hinrichs, Dusseldorf, Germany, assignors to International Standard Electric Corporation, New York, N.Y., a corporation of Delaware Filed Jan. 22, 1958, Ser. No. 710,572
Claims priority, application Germany Jan. 25, 1957
3 Claims. (Cl. 174—84)

Figure 1:
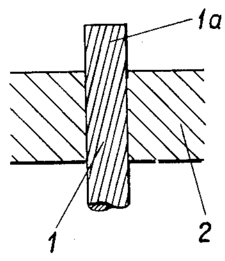

The present invention relates to electrical semiconductor devices, preferably to high-power rectifiers comprising semiconductive bodies of silicon, germanium or intermetallic compounds. To this group of rectifiers there also belong e.g. the so-called diffused rectifiers, with respect to which the application of the invention bears some special advantages. In this case there is in particular concerned the manufacture of a suitable electrode system comprising a semiconductor body.

The manufacture of diffused rectifiers is carried out e.g. in the conventional manner with the aid of plate-shaped semiconductor material which at first, for producing the desired type of conductivity, is subjected to a diffusion process, is then provided with a nickel coating and is cut into small square-shaped plates of a given size, to which the electrical lead-in wires are connected by soldering. As a suitable material for the connections there is used copper, and for the soldering there may serve previously shaped little plates of a lead-tin or lead-silver alloy comprising a solution of zinc-ammonium-chloride as a fluxing material. Thereupon the contacted rectifier is frequently subjected to an etching process and is then built into a housing for preventing any mechanical damages and atmospheric influences.

During the manufacture and the operation of such high-power rectifiers, however, there arise a number of difficulties which, a.o. are caused by the fact that one, due to the high currents, has to use thick connecting wires or means, which may be of the conventional type having the shape of rods, bolts or thick wires. These connecting means bear the disadvantage of producing mechanical stresses at the little rectifier plates during the operation of the rectifier device, which stresses are due to the expansions of the connecting means (wires, etc.) caused by the heating of the rectifier. For avoiding this disadvantage it has already been attempted to make the connecting means elastically, i.e. flexible, e.g. to provide them with a small helix or spiral, or to embody them in an S-shaped manner. When soldering such connecting leads, however, there will arise the difficulty that the solder can easily rise in the leads on account of the capillary effect, which may have a substantial effect upon the elasticity.

Further difficulties will arise when manufacturing such types of diffused rectifiers which, subsequently to the contacting, are subjected to an etching process. During the etching of the contacted rectifier the connecting material may not be attacked by the etching liquid. This problem has been tried to be solved e.g. by providing the connecting lead with a special metallic coating. However, it has been proved by experience that the conventional protective coatings become partially ineffective when soldering the connections, which is due to the high soldering temperature, e.g. by a partial diffusion of the coating into the base material.

The employment of the conventional connecting leads still bears a further disadvantage which consists in that only a part of the nickel coating on the little semiconductor plate is covered by the connections. In this way, at the subsequent etching of the contacted rectifier the non-covered or non-coated parts of the nickel layer will be removed and the cross-section useful to the current conductance will be reduced, which has a detrimental effect upon the flux characteristic.

Among others, it is the object of the present invention to avoid these disadvantages. The invention consists in that in a semiconductor device, in particular a rectifier for high power comprising a semiconductor body of silicon, germanium or an intermetallic compound, at least one of the connecting leads consists of an electrically well-conductive flexible stranded wire and, at least at one end, has a substantially massive enlargement ending in a surface, which is e.g. as plane as possible, lying transversely in relation to the longitudinal axis of the stranded wire, and which is adapted to the shape of the connecting surface of the semiconductor, and to which plane surface the connecting lead is mounted to the semiconducting body by means of a suitable solder. Such a type of embodiment of a connecting lead is capable of meeting the requirement of avoiding the creation of mechanical stresses at the semiconducting body during the operation; because the flexibility of the connecting lead also remains to exist after the soldering, since the massively enlarged portion prevents the production of a capillary effect that would otherwise permit the solder to rise in the stranded wire, which would lead to a stiffening of the connection. The practical application of the invention still bears the added advantage of enabling the production of an unobjectionable and reliable safe contacting of the semiconductive body by means of the wide and plane connecting surface of the lead-in. For the same reason there will also be obtained a good dissipation of heat from the semiconducting body, so that in this way there will be obtained a semiconductor device which is particularly reliable in operation, especially also at high powers.

Advantageously, the connecting element according to the invention is manufactured in that itself is deformed at one end to the shape of an enlargement comprising the desired characteristics or properties. To this end an electrically well-conductive flexible type of stranded wire is clamped into a gauge, i.e. in such a way that the one end somewhat projects and which is then, either with the air of e.g. a welding burner or in the course of a butt-welding, is melted to form an enlargement, and/or is pressed or squeezed to the desired shape. For providing a better contact-making on the semiconducting body the enlarged end of the stranded wire will be grounded off in a plane manner.

One particular embodiment of the invention consists in that the projecting end of the stranded wire is melted to the shape of a pearl, is then squeezed to a flat shape and is then smoothed on the surface. This manufacturing method is particularly simple and inexpensive, and there are only required few technical means.

In other types of embodiments the enlarged end is given the shape of a pyramid or of a cone. In these cases the connecting lead is continuously enlarged toward the end, which bears particular advantages with respect to subsequently etched semiconductor devices.

There may also be employed still other methods of manufacturing, all of which correspond insofar as the connecting elements can be manufactured in as few as possible working processes. The connecting leads may now be soldered directly to the semiconducting body in accordance with the conventional methods. In many applications it is of advantage to provide them with electrically well-conductive coatings prior to attaching them to the semiconducting body. Such a measure, for example, may be of importance for producing a good contacting of the semiconducting body. In particular, however, it is of importance to semiconductor devices which, after the contacting, are subjected to an etching process.

According to the invention, therefore, at least the enlarged part of the connecting lead is provided with one or more electrically well-conductive coatings, i.e. the outermost one of the coatings has to be of such kind that it, during the etching of the semiconductor device, does not dissolve in the employed etching liquid. To this end the outermost one of the coatings may consist of a suitable noble or rare metal. If, as a material for the connecting lead, there is used e.g. a stranded copper wire, then this coating will appropriately have to consist of gold. During the etching of the contacted semiconductor, e.g. in a mixture of hydrofluoric acid and nitric acid, this coating of gold will protect the stranded copper wire against any chemical attacks.

However, it has proved that the protection of gold of the stranded copper wire becomes far more reliable and effective when the stranded copper wire, prior to the gilding, is provided with a silver or nickel coating. This inventive measure is based on the following cognizance: When contacting the semiconducting body e.g. with a lead-tin or lead-silver solder then the arrangement is heated to a temperature of about 350° C. At this temperature a considerable portion of the gold coating diffuses into the copper material. Therefore, the gold protection on the stranded copper wire will be partially ineffective to the subsequent etching of the semiconductor device. Copper ions will be dissolved and will deposit as copper atoms on the semiconductor. In the case of e.g. rectifiers this may cause the p-n layer of the semiconductor to be short-circuited. By means of the intermediate nickel-plating or silver-plating according to the invention the diffusion of the coating of gold into the copper material will be substantially reduced. To this end, of course, it will be necessary to produce the silver-, or respectively nickel- and gold-coating in a sufficient thickness. It is of a particular advantage to deposit, prior to the guilding, two or more layers of silver and nickel in an alternate order of succession, so that in this way, the protecting layer of gold will be fully effective during the subsequent etching process. There may also be employed other materials for the individual coatings in case they, at the soldering temperature are capable of meeting the requirements of neither alloying with the connecting material nor with each other, and of neither diffusing into the connecting material, nor noticeably into one another.

For ensuring a better contact-making the surface that is connected with the semiconducting body by means of solder, is still provided at the enlarged end of the connecting lead with an electrically well-conductive coating of a material serving as the solder. When employing the conventional type of solder, this coating will exist e.g. of lead. The connecting elements manufactured in this way will now be soldered to the semiconducting body.

When subjecting the semiconductor device still to a supplementary etching process then, for avoiding the etching bath to be rendered impure, care will have to be taken that the contacted semiconducting body, during the etching, is only immersed so far into the bath that the coated, enlarged portion of the connecting lead but not the stranded wire itself is immersed. This measure of precaution is even advisable in the case of a completely coated connecting lead, because it may often happen that the plating at the transition point between the enlarged portion and the stranded wire is insufficient, so that just at this point ions of the stranded wire material are likely to migrate into solution during the etching process. In particular for this purpose it is proposed by the invention to give the enlarged portion of the connecting lead at least a length of 2 mm. so that, in any case, the danger of impurifying the etching bath is somewhat reduced thereby. Any extension of the enlarged portion in excess of 2 mm. will then also depend on the size of the enlarged connecting surface.

Another feature of the invention may be seen in the fact of designing the connecting lead in such a way that its enlarged end surface will completely cover-up the connecting surface of the semiconductor body during the contacting. In this way there may be achieved a particularly advantageous cooling effect which, especially in the case of e.g. high-power rectifiers, is of a great importance. This measure, however, is also of a special interest to semiconductor devices that are subsequently subjected to an etching process. In many cases the semiconducting body is plated on its connecting sides, among others for enlarging the current cross-section. When using the connections, which are not completely covering up the plating, the non-covered portions may be etched away. By means of this the cross-section useful for the current conductance, will be reduced, of course. By making use of the invention, however, it will be possible to avoid this disadvantage.

For the purpose of enabling a better understanding of the invention the inventive arrangement will be described in the following with reference to some examples of embodiment shown in the accompanying drawing.

Figure 2:
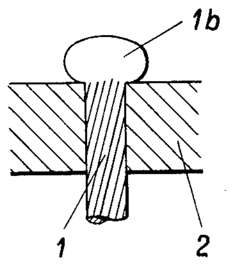
Figure 3:
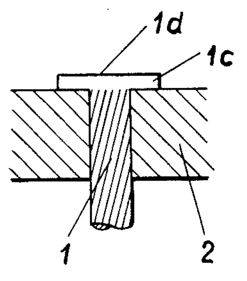
Figure 4:
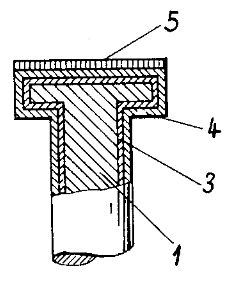
Figure 5:
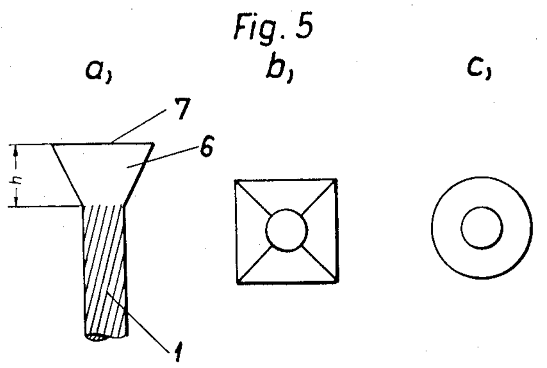
Figure 6:
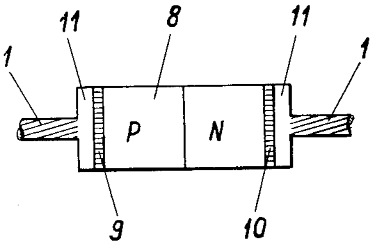

In FIGS. 1 through 3 there is shown in a side view the individual manufacturing stages for producing a connecting element according to the invention, i.e. in this case there is shown the manufacturing of the enlargement at its end. FIG. 4 is the cross-sectional view of a connecting lead manufactured in accordance with this method, and which is metal-coated for the above-mentioned purposes. In FIG. 5, partly in a side view and partly in a top view, there are shown some further types of embodiment of a connecting lead according to the invention. FIG. 6 schematically shows the cross-sectional view of a p-n type rectifier provided with the connections, and in FIG. 7 there is shown an inventive type of rectifier arrangement which is ready to operate.

In the FIGS. 1 through 3 the reference numeral 1 denotes the connecting lead which e.g. consists of a stranded copper wire. According to FIG. 1 this is clamped into a gauge 2, i.e. in such a way that at least the one end projects a small amount. This projecting portion 1*a* is melted e.g. with the aid of a welding burner, to the shape of a pearl 1*b*, as is shown in FIG. 2. For establishing a better contact on the semiconducting body this pearl is pressed or squeezed to form the flat enlargement 1*c* and the enlarged top surface 1*d* is planed, i.e. subjected to a surface grinding. This is shown in FIG. 3 of the drawings. The thus resulting connecting element may now be firmly soldered directly to the semi-conducting body.

In other cases, in which the connecting lead is supposed to be protected from chemical attacks the thus previously treated stranded copper wire will be metallically coated. A corresponding, suitable embodiment is shown in FIG. 4. The stranded copper wire 1 is provided with a silver or nickel coating 3 and will then be provided with a coating of gold 4. The enlarged end will then still be provided with a coating of lead 5, for the purpose of being soldered to the semiconducting body.

In FIG. 5 there is shown in a side view a connecting lead, consisting of a flexible stranded wire 1, with a portion 6 that is enlarged to the shape of a pyramid or cone. In FIGS. 5*b* and 5*c* these embodiments are shown in a top view as seen from the connecting lead. These shapes are characterized in that the stranded wire is continuously enlarge toward the end. Such types of embodiments are of a particular interest to semiconductor devices which are subjected to a subsequent etching process. The length *h* of the enlargement 6 is then supposed to amount to at least 2 mm. The shape of the enlarged end surface 7 will depend in particular upon the shape or shaping of the semiconducting body. If this body, as is the case for instance with diffused rectifiers, consists of a little square plate, then there will appropriately be chosen also an end surface that is enlarged to a square shape, if possible of same size as the connected surface of the semiconducting body. In any case, however, it is of importance that the enlargement terminates in a surface lying transversely in relation to the longitudinal axis of the stranded wire.

In the rectifier of the type as shown in FIG. 6 there are soldered to a semiconductor block 8 of the p-n type and which, on its connecting sides is provided with suitable metallic depositions 9 and 10, the stranded wire type connecting leads 1 with their enlarged end surfaces 11 and completely cover the connecting sides or surfaces of the semiconducting body, thus bringing about the advantages as outlined hereinbefore.

Figure 7:
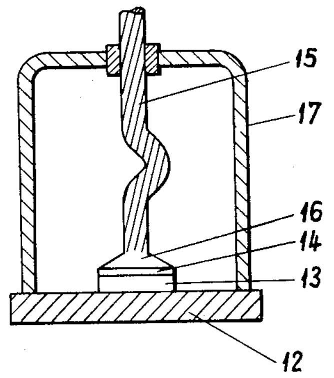

In the type of rectifier arrangement for high powers, as is shown in FIG. 7 of the drawings, there is used a metal support or base plate 12, at the same time serving as electrode, and to which the semiconducting body 13 is deposited in accordance with one of the conventional methods. The semiconducting body 13 is provided with a metal coating 14 to which the electrode lead-in 15 is soldered with the enlarged end 16. As a protection against mechanical damages and atmospheric influences the semiconductor is encased by a housing 17 through which the electrode lead-in 15 is led in an insulated manner. By designing the electrode lead-in as a flexible stranded wire there will be avoided any mechanical stresses at the rectifier during the operation of the rectifier arrangement or device, which are otherwise due to the heating of the rectifier and the thus existing considerable heat inside the housing, because the stranded connecting wire, neither at an expansion of the rectifier, nor at an expansion of the housing, will be lifted off the semiconducting body, or respectively can exert a pressure upon the latter. Furthermore, on account of the strongly enlarged end of the connecting lead there will result a good dissipation of heat from the rectifier and, at all forthcoming temperatures, there will be obtained a vastly reliable operating rectifier device.

It is to be understood that the invention is not limited to the given examples of embodiment, but that it also extends to similar other types of embodiment. With particular advantages the invention may also be applied to high-power rectifiers, e.g. to the so-called diffused and alloyed rectifiers, as well as to such ones employing drawn p-n layers.

What is claimed is:

1. An electrical semiconductor device comprising: a semiconducting body; a flexible stranded wire, one end of said wire comprising a substantially massive enlargement having a plane surface lying transversely to the axis of said stranded wire; and means connecting said plane surface to said body; characterized in that the enlargement is provided with a plurality of stacked alternate layers of silver and of nickel over which there is provided a coating of gold.

2. An electrical semiconductor device comprising: a semiconducting body; a flexible stranded wire, one end of said wire comprising a substantially massive enlargement having a plane surface lying transversely to the axis of said stranded wire; and means connecting said plane surface to said body; characterized in that the enlargement is provided with a coating of silver over which there is provided a coating of gold.

3. An electrical semiconductor device comprising: a semiconducting body; a flexible stranded wire, one end of said wire comprising a substantially massive enlargement having a plane surface lying transversely to the axis of said stranded wire; and means connecting said plane surface to said body; characterized in that the enlargement is provided with a coating of nickel over which there is provided a coating of gold.

References Cited in the file of this patent

UNITED STATES PATENTS

| | | |
|---|---|---|
| 2,531,660 | Ziegler | Nov. 28, 1950 |
| 2,697,047 | Ziegler | Dec. 14, 1954 |
| 2,806,187 | Boyer et al. | Sept. 10, 1957 |
| 2,934,685 | Jones | Apr. 26, 1960 |

OTHER REFERENCES

Publication I. "New Semiconductor Bonding Technique," published in Electronic Technician, September 1957 (page 71 relied on).